United States Patent
Velusamy et al.

(10) Patent No.: US 9,949,146 B1
(45) Date of Patent: Apr. 17, 2018

(54) CONTROL OVER DATA SERVICES THAT ARE DELIVERED OVER A WIRELESS ACCESS POINT

(71) Applicant: Sprint Communications Company L.P., Overland Park, KS (US)

(72) Inventors: Saravana Velusamy, Olathe, KS (US); Sreekar Marupaduga, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 84 days.

(21) Appl. No.: 15/093,171

(22) Filed: Apr. 7, 2016

(51) Int. Cl.
*G01R 31/08* (2006.01)
*H04W 24/02* (2009.01)
*H04H 20/02* (2008.01)
*H04W 72/08* (2009.01)
*H04J 11/00* (2006.01)
*H04B 3/36* (2006.01)
*H04W 8/08* (2009.01)
*H04W 88/08* (2009.01)
*H04W 88/16* (2009.01)

(52) U.S. Cl.
CPC .............. *H04W 24/02* (2013.01); *H04B 3/36* (2013.01); *H04H 20/02* (2013.01); *H04J 11/00* (2013.01); *H04W 8/082* (2013.01); *H04W 72/085* (2013.01); *H04W 88/08* (2013.01); *H04W 88/16* (2013.01)

(58) Field of Classification Search
CPC .............................. G06F 9/3836; G06F 9/3009
See application file for complete search history.

(56) References Cited

U.S. PATENT DOCUMENTS

| | | | |
|---|---|---|---|
| 7,233,805 B2 | 6/2007 | Choi | |
| 7,236,784 B2 | 6/2007 | Johannesson et al. | |
| 8,483,123 B2* | 7/2013 | Zheng | H04L 45/302 370/252 |
| 8,638,675 B2 | 1/2014 | Wang et al. | |
| 8,885,542 B2 | 11/2014 | Bucknell et al. | |
| 9,037,137 B2 | 5/2015 | Klatt | |
| 9,160,566 B2 | 10/2015 | Ulupinar et al. | |
| 9,603,001 B1* | 3/2017 | Malhotra | H04W 8/065 |
| 2011/0244789 A1* | 10/2011 | Wen | H04L 45/302 455/9 |
| 2014/0051437 A1* | 2/2014 | Diachina | H04W 48/06 455/434 |
| 2017/0006634 A1* | 1/2017 | Luo | H04W 74/085 |
| 2017/0150416 A1* | 5/2017 | Malhotra | H04W 36/32 |

* cited by examiner

*Primary Examiner* — Robert Wilson

(57) ABSTRACT

A wireless communication network controls data services that are delivered over a wireless access point. The wireless access point broadcasts service identifiers for the data services to user communication devices. The user communication devices and the wireless access point exchange the user data for the data services. The wireless access point and a network gateway exchange the user data for the data services. The network gateway processes the user data to determine if one of the data services falls below a Quality-of-Service (QoS) threshold. If one of the data services falls below its QoS threshold, then the network gateway transfers an instruction to stop wirelessly broadcasting the service identifier for the data service. The wireless access point receives the instruction and stops its wireless broadcast of the service identifier for the data service.

18 Claims, 8 Drawing Sheets

CONTROL OVER DATA SERVICES THAT ARE DELIVERED OVER A WIRELESS ACCESS POINT

TECHNICAL BACKGROUND

Data communication systems exchange user data to provide various services like media streaming, audio/video conferencing, data messaging, and internet access. The data communication systems use several communication networks to transfer the user data. In particular, the data communication systems use wireless networks to provide mobile and/or convenient access to their data services. Exemplary wireless communication protocols include Long Term Evolution (LTE) and Wireless Fidelity (WIFI). In wireless networks, the LTE and WIFI protocols typically carry the user data in Internet Protocol (IP) packets.

To implement wireless access, User Equipment (UE) and wireless base stations exchange wireless signals that transport user data and network signaling. The wireless base stations communicate with a core network over backhaul links. The core network includes various gateways, control systems, and user databases. The core network interacts with the UEs and the wireless base stations to deliver data services at the appropriate Quality-of-Service (QoS).

To extend wireless access beyond the base stations, wireless access points are deployed between the UEs and the wireless base stations to exchange the user data between. Exemplary wireless access points include wireless relays, hotspots, and data hubs. The wireless access points deliver various data services like internet access, voice calling, and video conferencing to the UEs.

Unfortunately, the quality control over data services that are delivered through both wireless access points and wireless base stations is not effective. In particular, the QoS of voice and video sessions that are handled by wireless access points and that are served by wireless base stations remains inefficient.

TECHNICAL OVERVIEW

A wireless communication network controls data services that are delivered over a wireless access point. The wireless access point broadcasts service identifiers for the data services to user communication devices. The user communication devices and the wireless access point exchange the user data for the data services. The wireless access point and a network gateway exchange the user data for the data services. The network gateway processes the user data to determine if one of the data services falls below a Quality-of-Service (QoS) threshold. If one of the data services falls below its QoS threshold, then the network gateway transfers an instruction to stop wirelessly broadcasting the service identifier for the data service. The wireless access point receives the instruction and stops its wireless broadcast of the service identifier for the data service.

DETAILED DESCRIPTION

Figure 1:
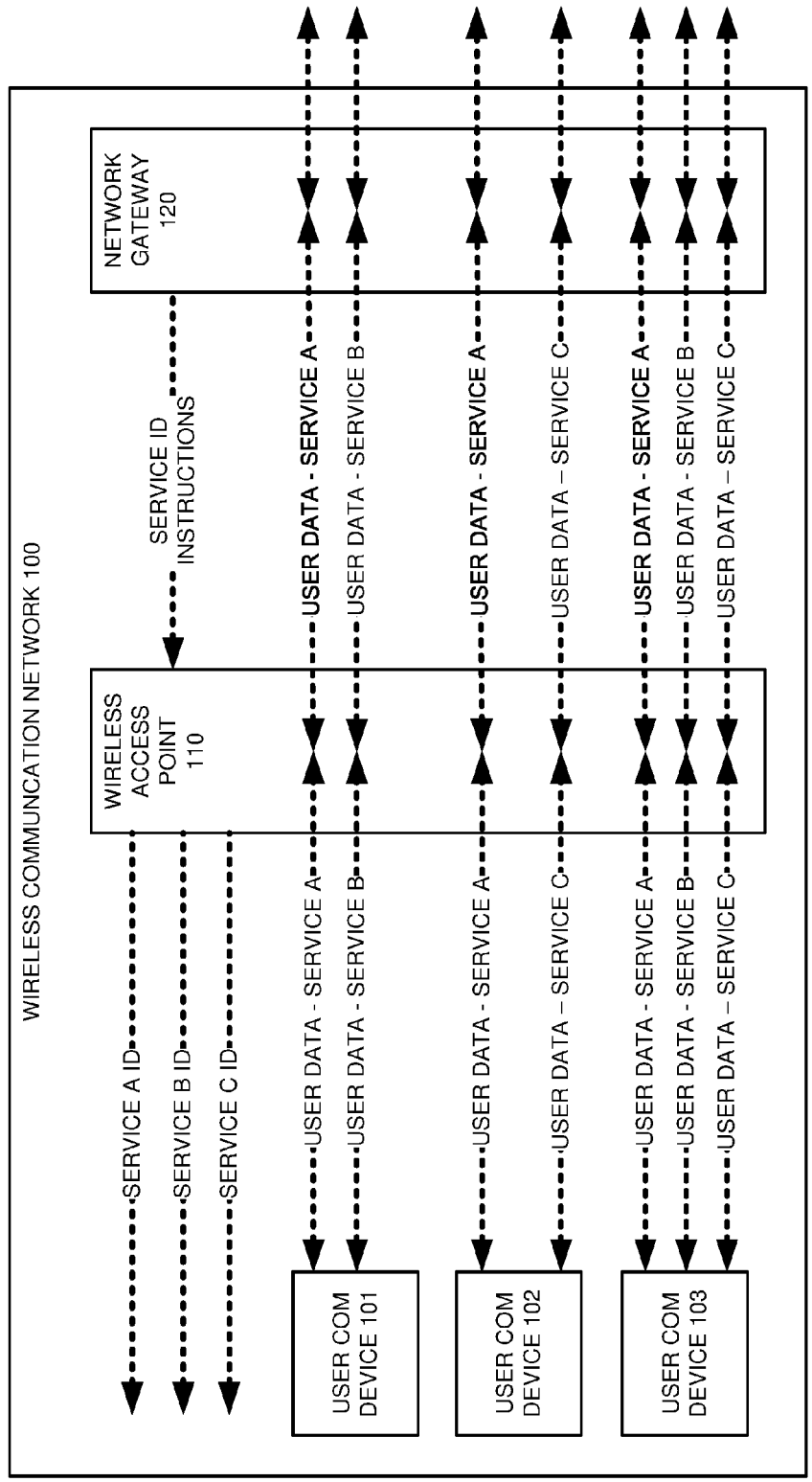
FIG. 1 illustrates a wireless communication network to control data services that are delivered over a wireless access point.

FIG. 1 illustrates wireless communication network 100 to control data services that are delivered over wireless access point 110. The data services are generally represented by the letters A, B, and C, and exemplary data services include Internet access, media streaming, messaging, file transfers, gaming, and the like. Wireless communication network 100 comprises user communication devices 101-103, wireless access point 110, and network gateway 120. User communication devices 101-103 comprise phones, computers, servers, or some other machines with intelligent communication transceivers.

Wireless access point 110 wirelessly broadcasts service identifiers (IDs) for respective data services A, B, and C. The service identifiers comprise Public Land Mobile Network (PLMN) IDs, Service Set IDs, pilots, beacons, or some other wireless broadcast codes that are indicative of data services A, B, and C. Wireless access point 110 comprises Radio Frequency (RF) components like antennas, filters, amplifiers, modulation circuitry, signal processors, and communication ports. Wireless access point 110 also comprises baseband components like routers, schedulers, controllers, and network applications. Exemplary wireless access points include wireless relays, Long Term Evolution (LTE) Evolved-Node Bs (eNodeBs), Wireless Fidelity (WIFI) hotspots, LTE/WIFI Aggregation (LWA) base stations, or some other type of wireless data hub.

Network gateway 120 also exchanges the user data for data services A, B, and C. Network gateway 120 has communication interfaces, routers, controllers, and data filters. Exemplary network gateways include LTE Packet Data Network Gateways (P-GWs), Proxy Mobile Internet Protocol (PMIP) Local Media Anchors (LMAs), Content Delivery Network (CDN) servers, and the like.

In response to the wireless broadcast of the service identifiers from wireless access point 110, user communication devices 101-103 wirelessly attach to wireless access point 110. User communication devices 101-103 and wireless access point 110 then exchange user data for data services A, B, and C. Likewise, wireless access point 110 and network gateway 120 exchange the user data for data services A, B, and C. Network gateway 120 exchanges the user data for data services A, B, and C with external systems.

Network gateway 120 processes the user data to determine if any of the data services falls below its Quality-of-Service (QoS) threshold. Exemplary QoS thresholds include uplink speed, downlink speed, latency metrics, packet loss, user device loading, and the like. A given QoS threshold may have various component QoS thresholds and indices that trigger data service control. The QoS thresholds may be further refined by a specific Access Point Name (APN), PLMN ID, Quality-of-Service (QoS) Class Identifier (QCI), SSID, Uniform Resource Indicator (URI), or some other identifying service code. Thus, network gateway 120 might process the user data associated with a specific APN/QCI combination against a custom QoS threshold for that APN/QCI combination to exert control over a data service at wireless access point 110.

If an individual data services falls below its QoS threshold, then network gateway 120 transfers a service ID instruction to wireless access point 110 to stop its wireless broadcast of the service ID for that data service. Wireless access point 110 receives the service ID instruction and responsively stops its wireless broadcast of the service ID for the data service that has fallen below its QoS threshold. This service ID instruction might be an S1-MME message, a Non-Access Stratum (NAS) message, or some other signaling data. The data service may be identified by APN, PLMN, QCI, SSID, URI, or some other identifying code—including combinations thereof. Wireless access point 110 may maintain on-going service sessions when stopping a service ID broadcast or wireless access point 110 may stop those on-going sessions as well. The decision to stop the on-going sessions may be user, access point, and/or service specific. Typically, network gateway 120 will transfer another service ID instruction to re-start the wireless broadcast of the service ID for the data service. Wireless access point 110 then restarts the wireless broadcast of the service ID for the data service.

Figure 2:
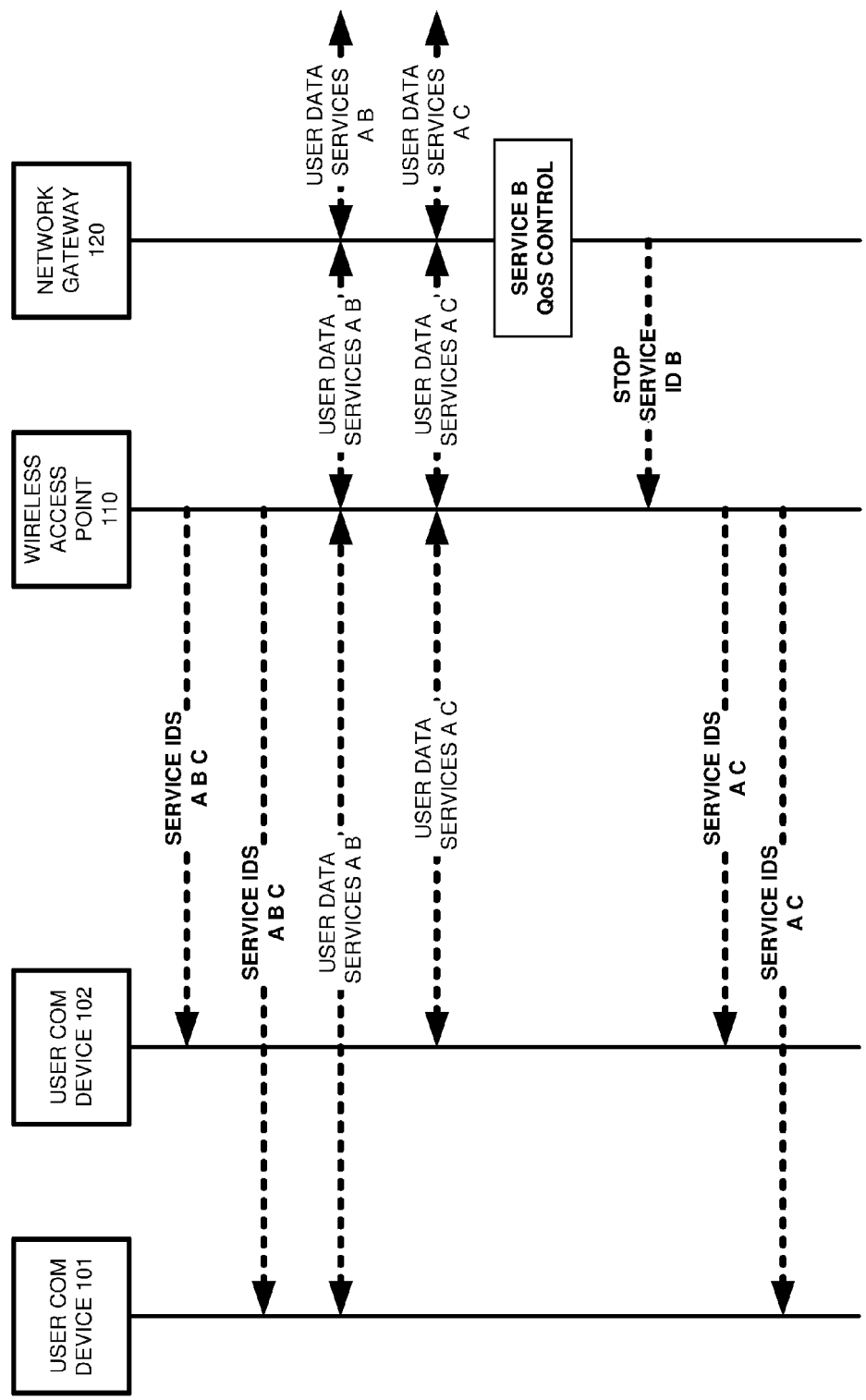
FIG. 2 illustrates the operation of a wireless communication network to control data services that are delivered over a wireless access point.

FIG. 2 illustrates the operation of wireless communication network 100 to control data services that are delivered over wireless access point 110. Note that user communication device 103 is not yet present. Wireless access point 110 wirelessly broadcasts service IDs for services A, B, and C to user communication devices 101-102.

In response to the service ID broadcast for data services A and B, user communication device 101 wirelessly attaches to wireless access point 110. User communication device 101 and wireless access point 110 wirelessly exchange user data for data services A and B—device 101 does not use service C. Wireless access point 110 and network gateway 120 exchange the user data for data services A and B. Network gateway 120 exchanges the user data with other systems. For example, user communication device 101 may attach to a wireless relay in response to its ViLTE PLMN ID broadcast, and the wireless relay would exchange user video for the ViLTE service over data communication network 100.

In response to the service ID broadcast for data services A and C, user communication device 102 wirelessly attaches to wireless access point 110. User communication device 102 and wireless access point 110 then exchange user data for data services A and C—device 102 does not use service B. Wireless access point 110 and network gateway 120 exchange the user data for data services A and C, and network gateway 120 exchanges the user data with other systems. For example, user communication device 102 may attach to an LWA base station in response to a VoLTE PLMN ID broadcast and the LWA base station would exchange user voice data for the VoLTE service over data communication network 100.

Network gateway 120 processes this user data to determine if any data service falls below its QoS threshold. For example, a video service may have a packet loss threshold exceeded for one of its CDN high-QoS URIs. If one of the data services falls below its QoS threshold, then network gateway 120 responsively transfers an instruction to wireless access point 110 to stop its wireless broadcast of the service ID for that data service. In this example, network gateway 120 determines that the service ID broadcast for data service B should be suspended at wireless access point 110. Network gateway 120 may suspend the service ID broadcast for data service B at other wireless access points as well.

Wireless access point 110 receives the instruction for data service B and responsively stops the wireless broadcast of the service identifier for data service B. Wireless access point 110 may stop the current service B session for user device 101 or allow it to continue—perhaps based on the user device ID, access point ID, and/or, service ID. Wireless access point 110 now broadcasts service IDs for data services A and C (and not B) to user communication devices 101-102.

Figure 3:
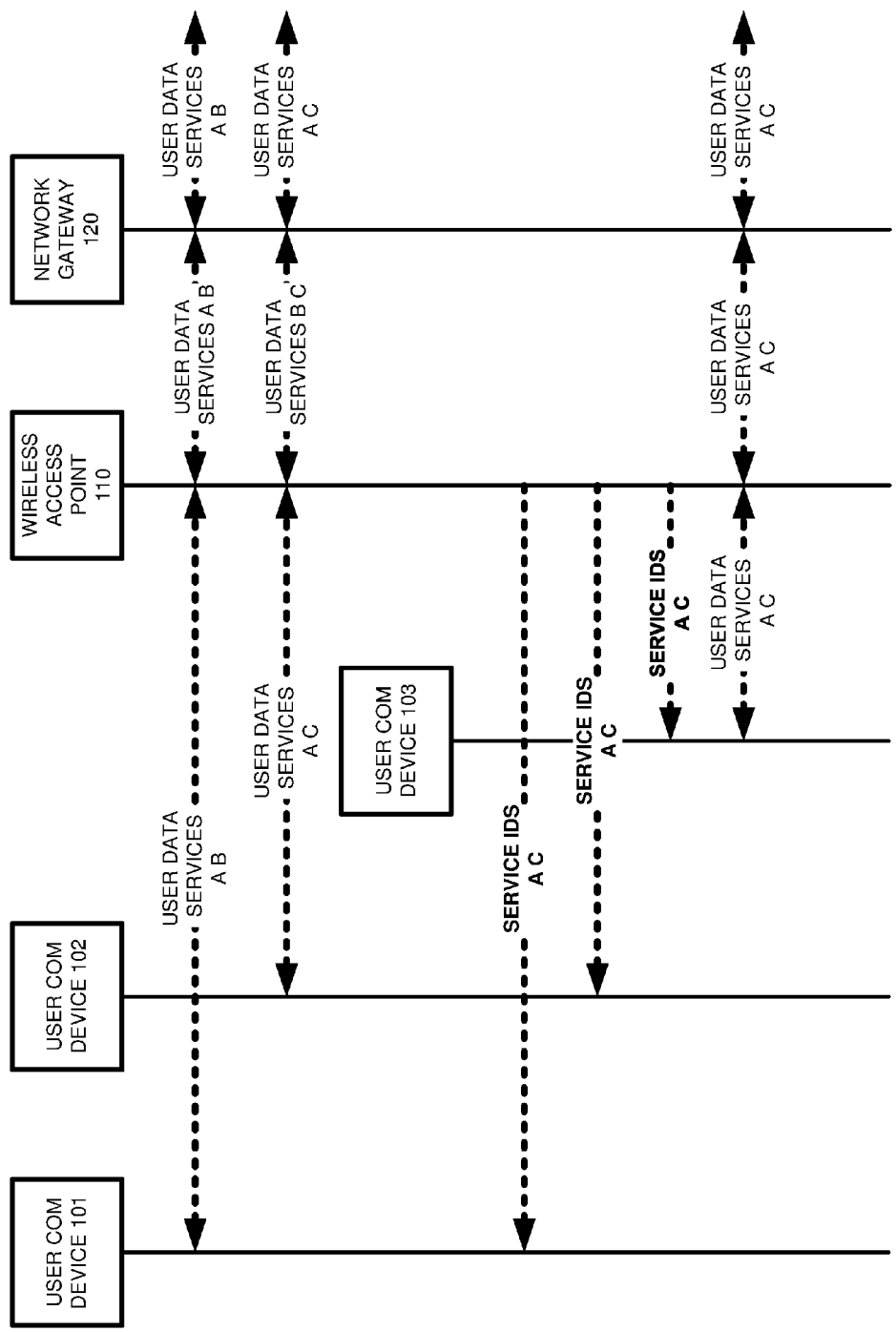
FIG. 3 illustrates the operation of a wireless communication network to control data services that are delivered over a wireless access point.

FIG. 3 further illustrates the operation of wireless communication network 100 to control data services that are delivered over wireless access point 110. User communication device 101 and wireless access point 110 still exchange user data for data services A and B, although the service B session may be terminated in other examples. Likewise, wireless access point 110 and network gateway 120 exchange the user data for data services A and B, and network gateway 120 exchanges the user data with other systems. User communication device 102 and wireless access point 110 still exchange user data for data services A and C. Likewise, wireless access point 110 and network gateway 120 exchange the user data for data services A and C, and network gateway 120 exchanges the user data with other systems.

User communication device 103 now arrives. Wireless access point 110 broadcasts service IDs for data services A and C (and not B) to user communication devices 101-103. In response to the service identifier broadcast for data services A and C, user communication device 103 wirelessly detects and attaches to wireless access point 110. User communication device 103 and wireless access point 110 then wirelessly exchange user data for data services A and C. User communication device 103 would have used data service B, but its service ID broadcast was not present.

Wireless access point 110 then wirelessly exchange user data for data services A and C. Wireless access point 110 and network gateway 120 exchange the user data for data services A and C, and network gateway 120 exchanges the user data with other systems. For example, user communication device 103 may attach to a wireless relay in response to its VoLTE SSID broadcast, but user communication device 103 would not receive the service ID for the suspended ViLTE service that was previously offered to user communication devices 101-102.

Figure 4:
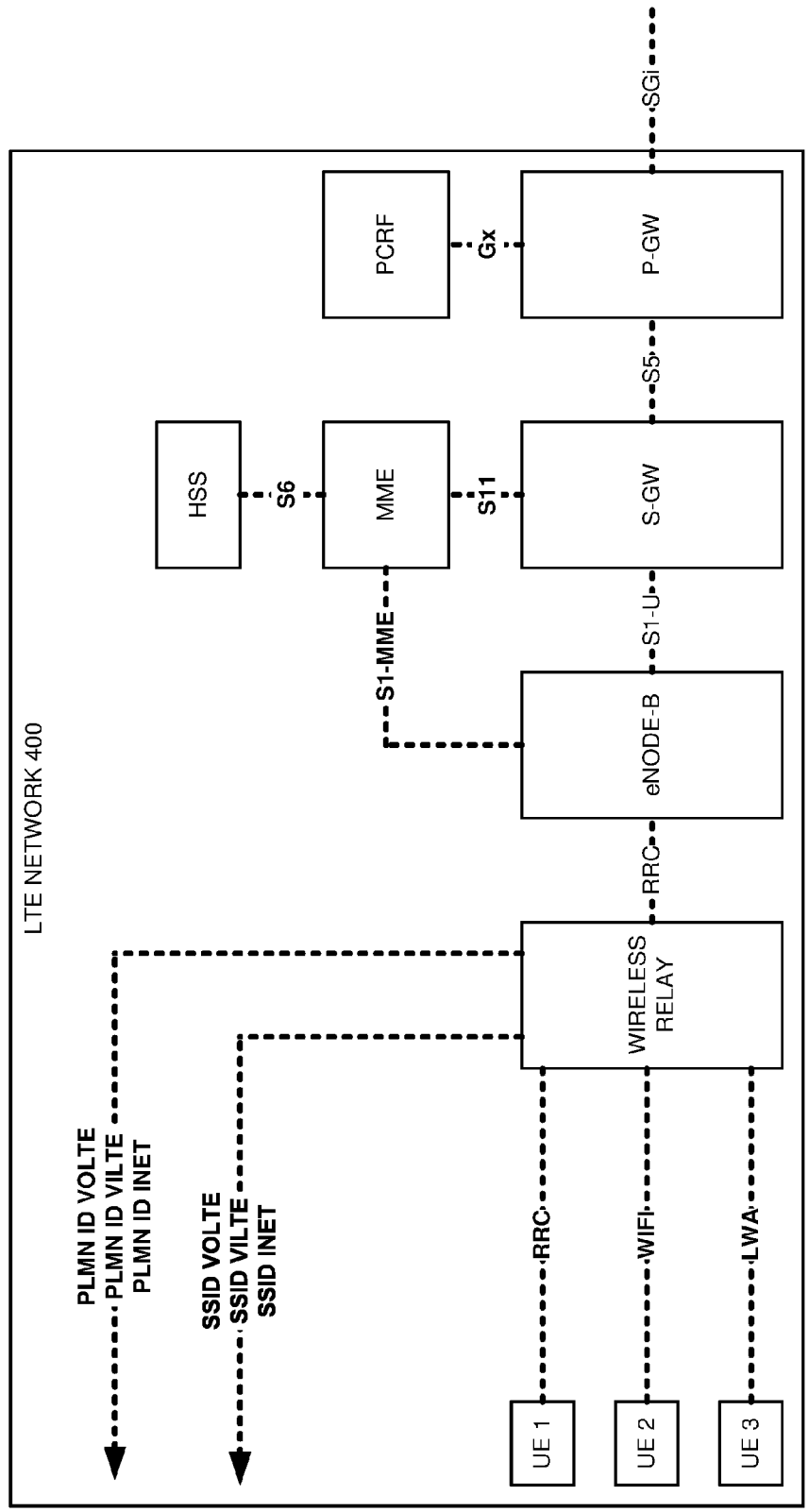
FIG. 4 illustrates a Long Term Evolution (LTE) Network to control data services that are delivered over a wireless relay.

FIG. 4 illustrates Long Term Evolution (LTE) Network 400 to control data services that are delivered over a wireless relay. LTE Network 400 is an example of data communication network 100, although network 100 may use alternative configurations and operations. LTE network 400 comprises UEs 1-3, the wireless relay, an eNodeB, Serving Gateway (S-GW), Mobility Management Entity (MME), Home Subscriber System (HSS), Packet Data Network Gateway (P-GW), and Policy Charging and Rules Function (PCRF).

UEs 1-3 and the wireless relay communicate using LTE Radio Resource Control (RRC), WIFI, or LWA. The wireless relay and the eNodeB communicate over LTE RRC. The eNodeB and the MME communicate over an S1-MME link. The eNodeB and the S-GW communicate over an S1-U link. The S-GW and the P-GW communicate over an S5 link. The S-GW and the MME communicate over an S11 link. The MME and the HSS communicate over an S6 link. The P-GW and the PCRF communicate over a Gx link.

The wireless relay broadcasts various data service IDs in the form of LTE PLMN IDs and LWA SSIDs for VoLTE, ViLTE, and Internet access (INET). UEs 1-3 receive the data service IDs and responsively attach to the wireless relay. The wireless relay performs LWA conversion for WIFI access. The wireless relay sends initial UE messages to the MME, and the MME accesses the HSS with the UE IDs, PLMN IDs, SSIDs, and the like. The HSS returns APNs like VoLTE, ViLTE, and DATA for UEs 1-3. The MME forwards the APNs to the S-GW, and the S-GW transfers the APNs to the P-GW. The P-GW forwards the APNs and UE IDs to the PCRF. The PCRF returns QCIs like 1, 2, 5, and 9 to the P-GW for UEs 1-3. The P-GW then establishes data bearers for UEs 1-3 based on the APNs and QCIs.

Figure 5:
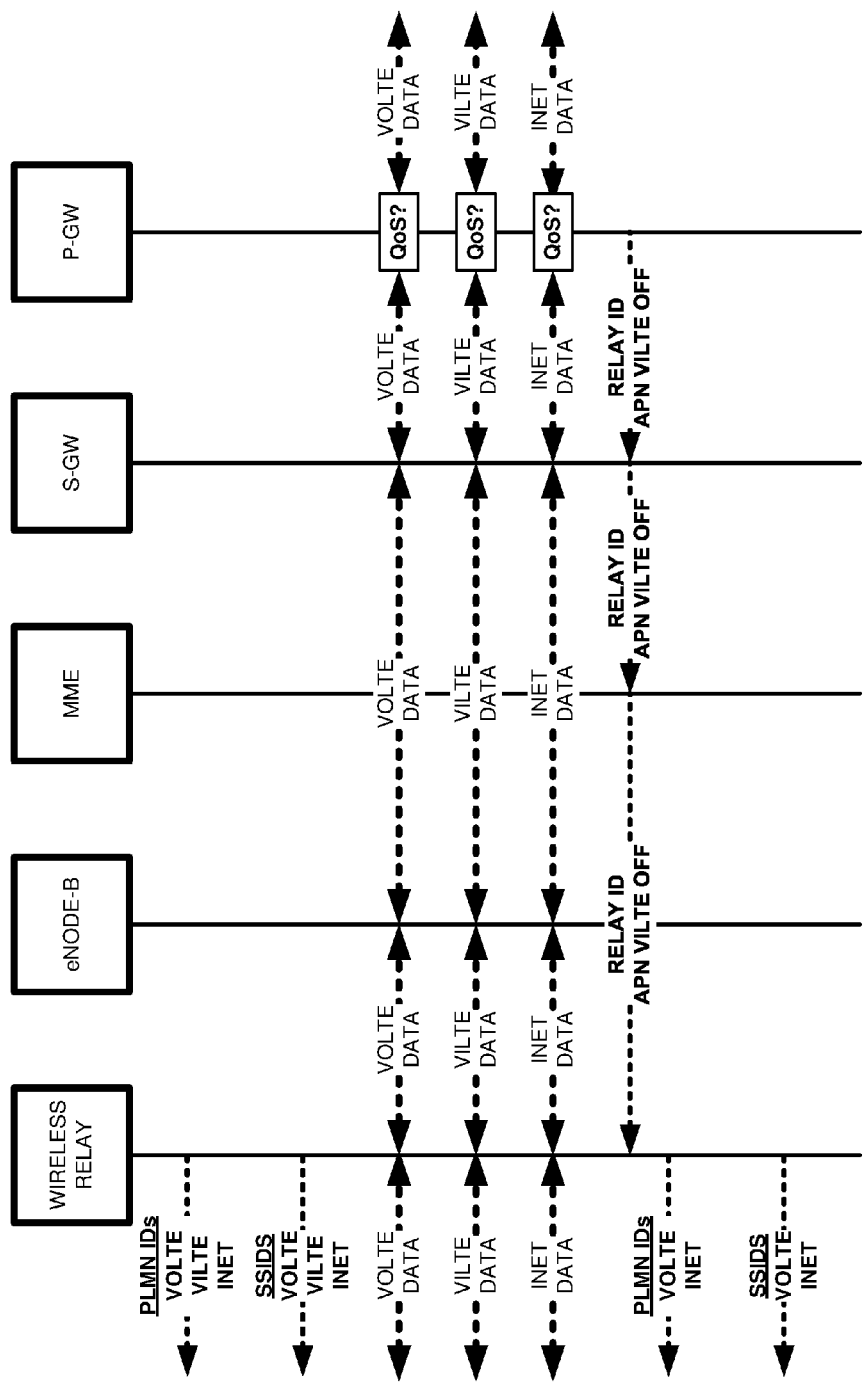
FIG. 5 illustrates the operation of the LTE Network to control data services that are delivered over the wireless relay.

FIG. 5 illustrates the operation of LTE Network 400 to control data services that are delivered over the wireless relay. The wireless relay wirelessly broadcasts PLMN IDs and SSIDs for data services VoLTE, ViLTE, and INET. In response, UEs 1-3 and the wireless relay exchange VoLTE data, ViLTE data, and INET data. The wireless relay and the eNodeB exchange the VoLTE data, ViLTE data, and INET data. The eNodeB and the S-GW exchange the VoLTE data, ViLTE data, and INET data. The S-GW and the P-GW exchange the VoLTE data, ViLTE data, and INET data. The P-GW exchanges the VoLTE data, ViLTE data, and INET data with external systems.

The P-GW processes the VoLTE data, ViLTE data, and INET data to determine if any of these data services falls below its QoS threshold. The P-GW may apply deep packet inspection to generate performance metrics and process these metrics to develop and score indices to apply the QoS threshold. In this example, the current uplink packet loss does not properly support the ViLTE service.

Since the ViLTE service has fallen below its QoS threshold, the P-GW transfers an S5 message to the S-GW for the wireless relay to stop broadcasting the service identifier for the ViLTE APN. The S-GW transfers an S11 message to the MME for the wireless relay to stop broadcasting the ViLTE APN service identifier. The MME transfers an S1-MME message to the wireless relay to stop broadcasting the service identifier for the ViLTE APN. The wireless relay receives the S1-MME message and stops its wireless broadcast of the ViLTE PLMN ID and the ViLTE SSID for the ViLTE APN. Thus, the wireless relay broadcasts the PLMN IDs and the SSIDs for the VoLTE and INET services only.

Figure 6:
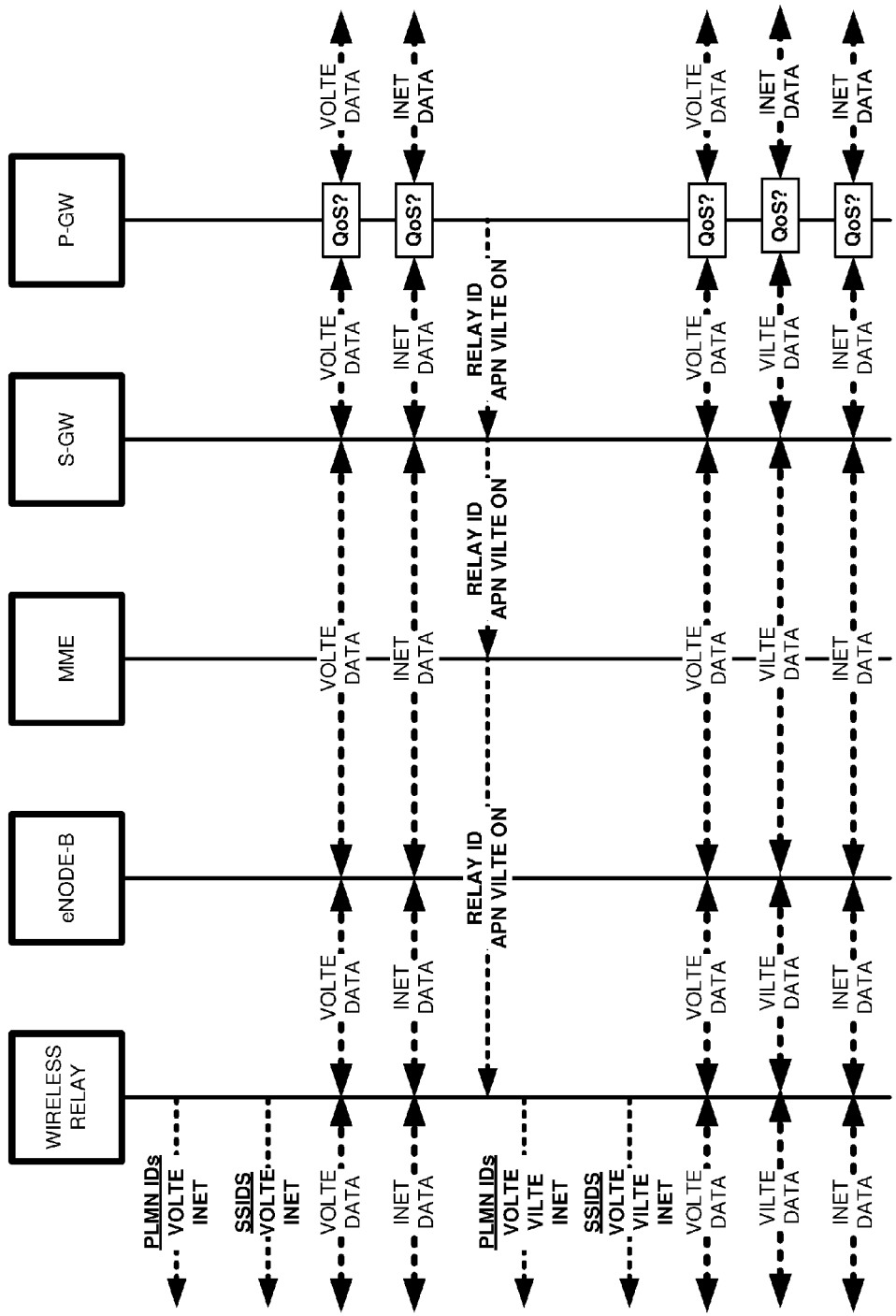
FIG. 6 illustrates the operation of the LTE Network to control data services that are delivered over the wireless relay.

FIG. 6 further illustrates the operation of LTE Network 400 to control data services that are delivered over the wireless relay. The wireless relay wirelessly broadcasts PLMN IDs and SSIDs for data services VoLTE and INET— the broadcast of the service IDs for the ViLTE service were suspended above. In response, UEs 1-3 and the wireless relay exchange VoLTE data and INET data. The wireless relay and the eNodeB exchange the VoLTE data and INET data. The eNodeB and the S-GW exchange the VoLTE data and INET data. The S-GW and the P-GW exchange the VoLTE data and INET data. The P-GW exchanges the VoLTE data and INET data with external systems.

The P-GW processes the VoLTE data and INET data to determine if any of these data services falls below their QoS threshold. Based on the VoLTE QoS, a time, period, or some other factor, the P-GW restarts the ViLTE APN at the wireless relay. To re-start the ViLTE APN, the P-GW transfers an S5 message to the S-GW for the wireless relay to restart the service ID broadcasts for the ViLTE APN. The S-GW transfers an S11 message to the MME for the wireless relay to restart the service ID broadcasts for the ViLTE APN. The MME transfers an S1-MME message to the wireless relay message to restart the service ID broadcasts for the ViLTE APN. The wireless relay receives the S1-MME message and restarts the wireless broadcast of the ViLTE PLMN ID and the ViLTE SSID for the ViLTE APN.

The wireless relay wirelessly now broadcasts PLMN IDs and SSIDs for VoLTE, ViLTE, and INET. In response, UEs 1-3 attach to the ViLTE service on the wireless relay. UEs 1-3 and the wireless relay now exchange VoLTE data, ViLTE data, and INET data. The wireless relay and the eNodeB exchange the VoLTE data, ViLTE data, and INET data. The eNodeB and the S-GW exchange the VoLTE data, ViLTE data, and INET data. The S-GW and the P-GW exchange the VoLTE data, ViLTE data, and INET data. The P-GW exchanges the VoLTE data, ViLTE data, and INET data with external systems. The P-GW again processes the VoLTE data, ViLTE data, and INET data to determine if any of these data services falls below its QoS threshold.

As an alternative to the S1-MME messages between the MME and the wireless relay, the MME may send a Non-Access Stratum (NAS) message to a UE resident in the wireless relay to stop broadcasting the ViLTE service ID. The UE would then instruct an eNodeB resident in the wireless relay to stop the ViLTE service ID. As another alternative to the S1-MME message to the relay, the MME may send an S1-MME message to the eNodeB for the wireless relay to stop broadcasting the ViLTE service ID. The eNodeB would inform a UE resident in the wireless relay to stop broadcasting the ViLTE APN service ID over RRC configuration messaging, and the relay UE instructs a relay eNodeB in the relay to stop the ViLTE service ID broadcasts.

Figure 7:
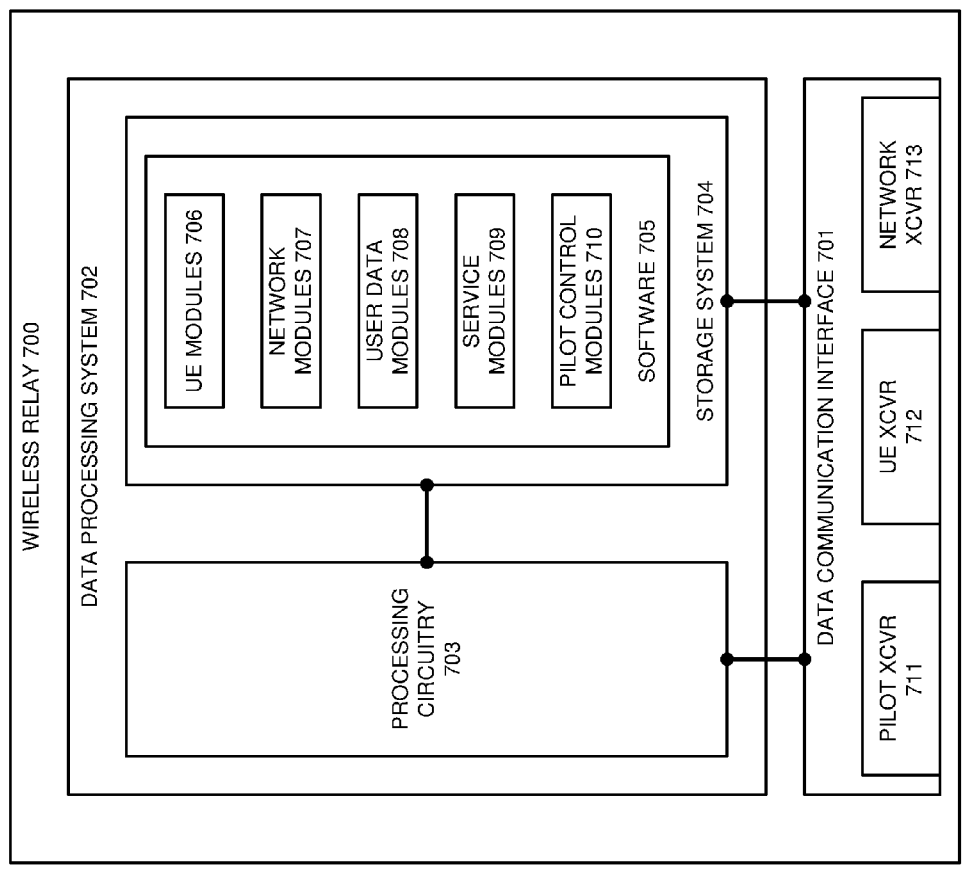
FIG. 7 illustrates a wireless relay to control data services.

FIG. 7 illustrates wireless relay 700 to control data services that are delivered over wireless relay 700. Wireless relay 700 comprises data communication interface 701 and data processing system 702. Data communication interface 701 comprises communication transceivers 711-713. Data processing system 702 comprises processing circuitry 703 and storage system 704. Storage system 704 stores software 705. Software 705 includes respective software modules 706-710.

Communication transceivers 711-713 comprise pilot transceiver 711, UE transceiver 712, and network transceiver 713. Communication transceivers 711-713 include communication components, such as ports, bus interfaces, signal processors, memory, software, and the like. Processing circuitry 703 comprises server blades, circuit boards, bus interfaces, integrated circuitry, and associated electronics. Storage system 704 comprises non-transitory, machine-readable, data storage media, such as flash drives, disc drives, memory circuitry, servers, and the like. Software 705 comprises machine-readable instructions that control the operation of processing circuitry 703 when executed.

Software 705 includes software modules 706 and may also include operating systems, hypervisors, applications, data structures, virtual network elements, utilities, and the like. Wireless relay 700 may be centralized or distributed. All or portions of software 706-710 may be externally stored on one or more storage media, such as circuitry, discs, and the like. Some conventional aspects of wireless relay 700 are omitted for clarity, such as power supplies, enclosures, and the like.

When executed by processing circuitry 703, software modules 706-710 direct circuitry 703 to perform the following operations. UE modules 706 interact with User Equipment (UE) and network modules 707 to use the service IDs to establish communication sessions and deliver the corresponding data services. Network modules 707 interact with UE modules 706 and wireless data networks to use the service IDs to establish communication sessions and deliver the corresponding data services. User data modules 708 process user data under the control of service modules 709 to deliver the data services. Service modules 709 interact with modules 706-708 based on the service IDs to coordinate registration, requests, and communication sessions for specific data services. Pilot control modules 710 turn the wireless broadcasts of the service IDs on and off under the control of network gateways.

Figure 8:
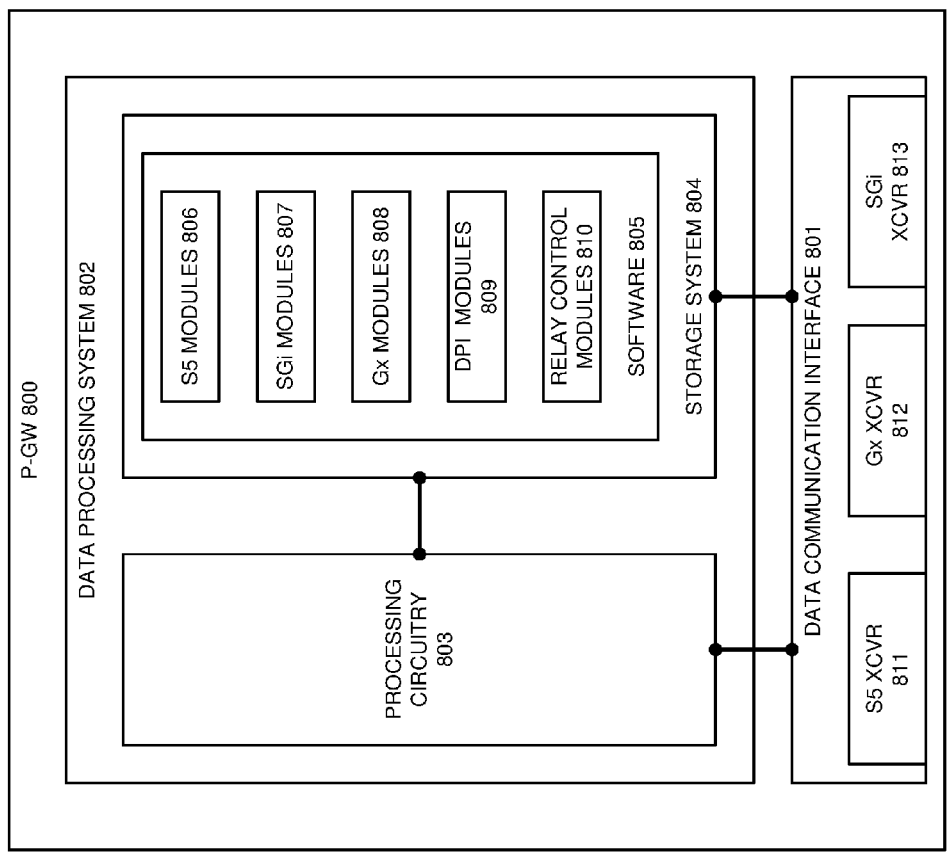
FIG. 8 illustrates a P-GW to control data services that are delivered over a wireless access point.

FIG. 8 illustrates Packet Data Network Gateway (P-GW) 800 to control data services that are delivered over a wireless access point. P-GW 800 comprises data communication interface 801 and data processing system 802. Data communication interface 801 comprises communication transceivers 811-813. Data processing system 802 comprises processing circuitry 803 and storage system 804. Storage system 804 stores software 805. Software 805 includes respective software modules 806-810.

Communication transceivers 811-713 comprise S5 transceiver 811, Gx transceiver 812, and SGi transceiver 813. Communication transceivers 811-813 include communication components, such as ports, bus interfaces, signal processors, memory, software, and the like. Processing circuitry 803 comprises server blades, circuit boards, bus interfaces, integrated circuitry, and associated electronics. Storage system 804 comprises non-transitory, machine-readable, data storage media, such as flash drives, disc drives, memory circuitry, servers, and the like. Software 805 comprises machine-readable instructions that control the operation of processing circuitry 803 when executed.

Software 805 includes software modules 806 and may also include operating systems, hypervisors, applications, data structures, virtual network elements, utilities, and the like. P-GW may be centralized or distributed. All or portions of software 806-810 may be externally stored on one or more storage media, such as circuitry, discs, and the like. Some conventional aspects of P-GW 800 are omitted for clarity, such as power supplies, enclosures, and the like.

When executed by processing circuitry 803, software modules 806-810 direct circuitry 803 to perform the following operations. S5 modules 806 interact with S-GWs to establish communication sessions and transfer service ID signaling. SGi modules 807 exchange user data for the data sessions with external systems. Gx modules 808 interact with PCRFs to translate APNs and the like into QCIs and other instructions. Deep Packet Inspection (DPI) modules 809 process user data for PLMN/APN/QCI combinations to develop QoS metrics and indices. Relay control modules 810 process the QoS metrics and indices from DPI modules 809 to turn data service ID broadcasts on and off at various wireless access points.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication network having a wireless access point and a data gateway to control multiple data services, the method comprising:
   the wireless access point wirelessly broadcasting service identifiers for the data services, and in response, user communication devices and the wireless access point wirelessly exchanging user data for the data services;
   the wireless access point and the network gateway exchanging the user data for the data services;
   the network gateway processing the user data to determine if one of the data services falls below a Quality-of-Service (QoS) threshold for the one of the data services;
   if one of the data services falls below the QoS threshold, then the network gateway responsively transferring an instruction to stop wirelessly broadcasting one of the service identifiers for the one of the data services that fell below the QoS threshold; and
   the wireless access point receiving the instruction and stopping the wireless broadcast of the service identifier for the data service that fell below the QoS threshold.

2. The method of claim 1 wherein the wireless access point comprises a wireless relay.

3. The method of claim 1 wherein the network gateway comprises a Packet Data Network Gateway.

4. The method of claim 1 wherein the wireless access point receiving the instruction to stop wirelessly broadcasting the one of the service identifiers comprises the wireless access point receiving a Long Term Evolution (LTE) S1-Mobility Management Entity (S1-MME) message.

5. The method of claim 1 wherein the wireless access point receiving the instruction to stop wirelessly broadcasting the one of the service identifiers comprises the wireless access point receiving a Non-Access Stratum (NAS) message.

6. The method of claim 1 wherein the network gateway transferring the instruction to stop wirelessly broadcasting the one of the service identifiers and the wireless access point receiving the instruction comprises transferring and receiving an Access Point Name (APN) to indicate the one of the data services.

7. The method of claim 1 wherein the network gateway transferring the instruction to stop wirelessly broadcasting the one of the service identifiers and the wireless access point receiving the instruction comprises transferring and receiving a Public Land Mobile Network Identifier (PLMN ID) to indicate the one of the service identifiers.

8. The method of claim 1 wherein the network gateway transferring the instruction to stop wirelessly broadcasting the one of the service identifiers and the wireless access point receiving the instruction comprises transferring and receiving a Service Set Identifier (SSID) to indicate the one of the service identifiers.

9. The method of claim 1 further comprising:
   the network gateway transferring another instruction to start wirelessly broadcasting the one of the service identifiers for the one of the data services; and
   the wireless access point receiving the other instruction, and in response, wirelessly broadcasting the one of the service identifiers for the one of the data services.

10. A wireless communication network to control multiple data services, the wireless communication network comprising:
    a wireless access point comprising access point communication transceivers and access point processing circuitry configured to wirelessly broadcast service identifiers for the data services, wirelessly exchange user data for the data services with user communication devices, and exchange the user data for the data services through a network gateway; and the network gateway comprising gateway communication transceivers and gateway processing circuitry configured to process the user data to determine if one of the data services falls below a Quality-of-Service (QoS) threshold for the one of the data services, and if one of the data services falls below the QoS threshold, then to responsively transfer an instruction to stop wirelessly broadcasting one of the service identifiers for the one of the data services that fell below the QoS threshold; and the wireless access point is configured to receive the instruction and stop the wireless broadcast of the service identifier for the data service that fell below the QoS threshold.

11. The wireless communication network of claim 10 wherein the wireless access point comprises a wireless relay.

12. The wireless communication network of claim 10 wherein the network gateway comprises a Packet Data Network Gateway.

13. The wireless communication network of claim 10 wherein the wireless access point is configured to receive a Long Term Evolution (LTE) S1-Mobility Management Entity (S1-MME) instruction to stop wirelessly broadcasting the one of the service identifiers.

14. The wireless communication network of claim 10 wherein the wireless access point is configured to receive a Non-Access Stratum (NAS) instruction to stop wirelessly broadcasting the one of the service identifiers.

15. The wireless communication network of claim 10 wherein the network gateway is configured to use an Access Point Name (APN) to indicate the one of the data services.

16. The wireless communication network of claim 10 wherein the network gateway is configured to use a Public Land Mobile Network Identifier (PLMN ID) to indicate the one of the service identifiers.

17. The wireless communication network of claim 10 wherein the network gateway is configured to use a Service Set Identifier (SSID) to indicate the one of the service identifiers.

18. The wireless communication network of claim 10 further comprising:

the network gateway is further configured to transfer another instruction to start wirelessly broadcasting the one of the service identifiers for the one of the data services; and the wireless access point is further configured to receive the other instruction, and in response, to wirelessly broadcast the one of the service identifiers for the one of the data services.

* * * * *